Dec. 9, 1941.　　　　C. A. ADAMS　　　　2,265,933
ELECTRIC DRIVE
Filed June 16, 1938
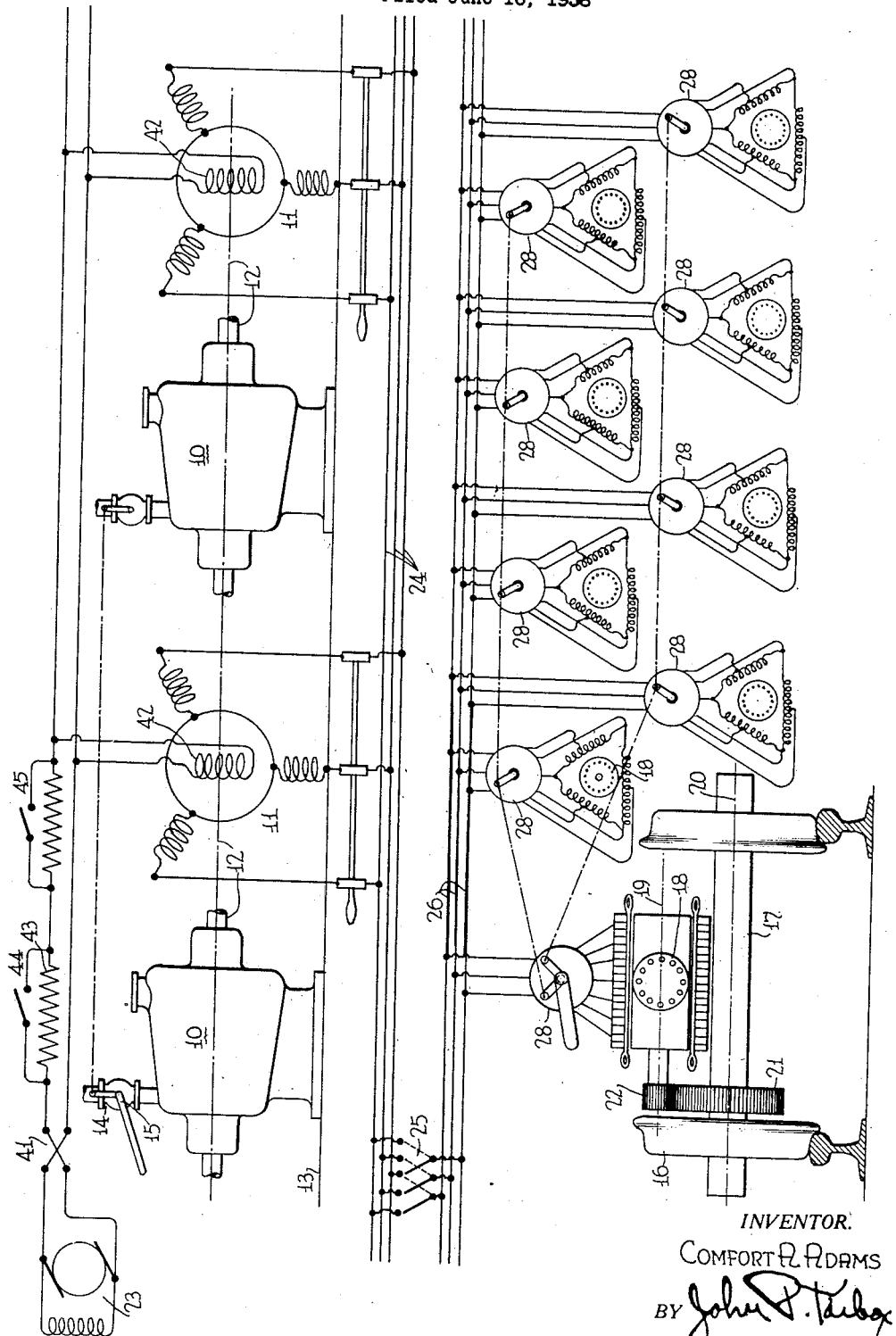
INVENTOR.
COMFORT A. ADAMS
BY John P. Tilbox
ATTORNEY.

Patented Dec. 9, 1941

2,265,933

UNITED STATES PATENT OFFICE 2,265,933

ELECTRIC DRIVE

Comfort A. Adams, Philadelphia, Pa., assignor to Edward G. Budd Mfg. Company, Philadelphia, Pa., a corporation of Pennsylvania Application June 16, 1938, Serial No. 214,110

5 Claims. (Cl. 290—17)

My invention relates to turbo-electric drive systems for vehicles and particularly to such systems as are utilized in connection with electric railway locomotives.

The outstanding object of my invention is saving in weight and cost, and with respect to the latter, both initial and maintenance, although a scarcely secondary object is improvement in overall efficiency, for a maximum saving of weight cannot be had without a very high consideration of efficiency.

Turbo-electric drive systems for electric locomotives have heretofore been outstandingly objectionable because of the high weight and accompanying high cost as well as excessive space requirements. The greater the masses of metals involved, the greater is the cost of the those metals and multiplied cost of fabricating those metals into machinery. Further the ratio of locomotive weight to horse power developed or weight of train that can be hauled is of great importance and is an important factor in calculating overall efficiency.

In locomotive work, alternators have been proposed because of the restrictions on speed and capacity of direct-current machines, principally due to commutation limitations. Turbines of such turbo-alternator units because of the low weight requirements so far as is known, have usually operated at speeds incompatible with the permissible speeds of the alternators used, and the two were therefore still connected together by a ponderous reduction gear resulting in high weight and considerable transmission losses as well as high cost. The power has been applied to the vehicle propelling members, for example, the wheels or axles of the locomotive, by a multiple number of induction motors. The frequency of these motors has been the frequency of the alternator, and these frequencies have been outstandingly those imposed by the low speed of the alternator made necessary by the employment of standard frequencies. Control of the induction motor starting and running speeds and torques has been by concatenation. Direct-current transmission results in lower space economy, lower efficiency and higher weights per horse power.

According to my invention, I utilize induction motors of the simple squirrel cage type in geared relation to the locomotive drive wheels. By employing the highest gear ratio permissible and by designing the motors to fit the available space and to operate at the corresponding highest speed possible and employing a high rotor peripheral velocity, a minimum weight per motor horse power is obtained. However, such a motor, if of the six pole type, will require an operating frequency of as high as one hundred sixty-five cycles per second to obtain the required maximum locomotive speed. Such high frequencies have not heretofore been known to have been considered for locomotive drives. It is therefore also a part of my invention to combine with the motors, a variable speed direct-connected turbo-alternator, capable of supplying any frequency up to the high frequency required for maximum speed and thus control the speed of the locomotive through the speed of the turbine and the turbine throttle.

According to a second phase of my invention, I select an alternator or alternators of the highest speed consistent with the frequency and with due consideration of the weight, and because of the relatively high speed the alternator can therefore be efficiently driven by direct connection to the turbine, thus permitting the turbine to operate at an efficient speed and weight per horse power, yet avoiding the excessive weight of reduction gearing.

A third phase of the invention has to do with the solution of the problem of obtaining a sufficient starting tractive effort, yet correlating the operation of the turbine, alternator and induction motors in such a manner as to afford desirable starting characteristics without resorting to overloading and overheating any portion of the apparatus, without danger of the turbo-alternator's pulling away from the motor, and without resorting to complicated and expensive arrangements. For example, I have discovered that the maximum starting tractive effort is obtained with an overexcitation in the neighborhood of 45% and that further overexcitation does not increase, but decreases the starting tractive effort. With a pole changing arrangement to double the poles of each motor during starting, the motor torque is doubled. I coordinate this excitation and pole changing either with the rising frequency of the alternator or the rising speed of the vehicle, reducing it progressively as the frequency and speed increase and ultimately reducing the number of poles to normal. Further I correlate the turbine capacity and torque at the various speeds so as never to exceed the drag and load imposed upon the alternator by the drive motors. Thus the system is in a way an electro-inductive clutch.

My invention may perhaps be the more readily understood by the aid of a diagram depicting the relations of its elements and explaining them.

In the drawing, the single figure is a diagram showing symbolically a turbo-electric drive system embodying my invention as applied to an electric locomotive.

Referring to the figure, the turbine of the turbo-alternator group is designated 10 and the alternator 11. They are direct-connected through a shaft 12. Together they rest upon the floor 13 of the locomotive. The turbine is supplied with fluid pressure through conduit 14 fed from and suitable source (not shown). Throttle means, diagrammatically illustrated as a valve 15, control the speed and power of the turbine. While two such turbo-alternator groups are shown in many instances, one turbine and alternator will suffice as will be hereinafter explained. Still others may be used in the same vehicle. Their throttles are, as indicated, interconnected for common operation in substantial synchronism, where more than one turbine is employed.

The driving wheels of the locomotive are designated 16 and the connecting axle or shaft 17. The wheels and axles may rotate together, or the axle may be fixed and the wheels only rotate. In either event, either the wheel 16 or the axle 17 may stand in the relation of the vehicle propelling member. The number of these axles and wheels varies in accordance with the size of the locomotive, and the number of locomotives connected in tandem.

In connection with each axle is provided one or more induction motors 18, located between the wheels 16, have an axis 19 paralleling the axis 20 of the axle of shaft 17, swiveling about the axis 20 and gear-connected either directly to the axle 17 or through a quill or independently thereof to the wheel 16 through the main gear 21 and pinion 22. In the diagram I show but one pair of wheels 16 and associated axle 17, but a number of motors 18. Each of these motors will be similarly associated with an axle 17 and wheels 16 to drive the wheels and in any desired number.

Electrically I have embodied the system as a three-phase system and shown the generator windings "Y" connected, and motor stator windings as delta-connected for starting. A direct-current exciter 23 provides current for the field of the alternator. The exciter may be driven from any suitable source. Through individual suitable switches I connect the alternators where more than one to a common synchronizing circuit 24. The synchronizing circuit 24 from the alternators I connect in common through a triple-pole line and reversing switch 25 to the locomotive power mains 26. I distribute power from these mains in parallel to all the induction motors 18 through pole-changing switches 28 adapted to double the number of effective poles.

By employing the highest gear ratio possible (approximately five to one) the same being limited for mechanical reasons principally by gear teeth limitations, and by employing the highest motor rotor peripheral velocity, six pole induction motors of the squirrel cage type and of approximately six or seven hundred horse power can be accommodated adjacent the locomotive axle. Such an arrangement with fifty-six inch driving wheels produces a motor speed of 3200 R. P. M. approximately for a speed of one hundred five miles per hour.

In combination therewith, a four pole alternator may be used with a resulting speed of about five thousand R. P. M. as a maximum, which speed is sufficiently high to operate efficiently in conjunction with a turbine and without the necessity of any reduction gearing. Such alternator may be of approximately forty-two hundred horse power capacity and operate six motors of six or seven hundred horse power capacity each.

While the foregoing arrangement is preferred, and would result in the least weight per horse power, variations can be made in the speeds and frequencies employed, as well as the number of poles of the motors and alternators. For example, four pole motors may be employed in which case through the pole changing switch, eight effective poles may be had for starting. In such an arrangement, a smaller driving wheel would be employed, for example, forty-two inch diameter, and the individual motors would consequently be smaller and of approximately four hundred horse power each. In such an instance, because of the lower frequency, which for maximum speed would be in the order of one hundred thirty cycles approximately, a four pole alternator would be too slow for efficient direct connection to a turbine, since turbine efficiency decreases as the speed is brought lower than five thousand R. P. M. Consequently a two pole alternator would be used but because of the speed increase, it would be more practical to employ alternators of approximately fifteen hundred to eighteen hundred horse power capacity, and if greater horse power is required, two turbines and alternators or two alternators driven by a single turbine can be employed. Where two turbines are employed, they may operate in tandem as two stages, for efficiency, but the throttles of all turbines would be synchronously opened and closed.

While both the above combinations provide a system of low weight per horse power, the first combination embodying the four pole alternator and six pole motors has some advantage over the other, for six pole motors require less stator cross section than four pole motors and therefore may be somewhat lighter, and the same is true in connection with the four pole alternators, which, although slower speed, and therefore seem somewhat heavier, can actually be constructed lighter than a corresponding two pole alternator because of the saving in stator weight due to less cross section being required to carry the flux. The larger diameter four pole rotor assists cooling and provides more space for excitation windings. Because of smaller stator cross section, the overall diameter of the four pole alternator may actually be less than a corresponding two pole one.

The control of a locomotive embodying my invention is jointly by the throttle or throttles 15 of the turbines, by the alternator switch or swiches 25, the pole-changing switch or switches 28, and the variation in field excitation. Assuming the locomotive to be at a standstill with throttles closed or adjusted for idling, switches 25 open, and the pole-changing switch 28 set for the maximum number of poles in the motor (in a specific embodiment given, either eight or twelve poles), first the resistor 43 is short-circuited by switch 44 overexciting the alternator fields 42 about 45%, then the line switch 25 is closed, and then the throttles 15 are opened as desired, bringing the generators 11 and motors 18 up to speed, in the process supplying the power at gradually increasing voltage and frequency to the motors 18, all without heavy resistors or transformers. Treble the full power running torque with the minimum number of poles is capable of being developed at starting, which is the same as 1½ times the full load torque obtainable with the maximum number of poles, twice the number of poles giving half the speed. The locomotive moves drawing its connected train with it. I achieve this with an optimum overexcitation of approximately 45% when starting from an alternator frequency of approximately 7.5 cycles, which is very approximately 5% of the normal frequency or speed whether the frequency be 130 or 165 cycles. The field excitation may be progressively decreased during building up of speed by successive opening of switches such as 44 and 45, causing the field excitation step by step to take a reduced value approximating a gradual reduction. So starting it builds up speed to half full rated speed. The combination of limits of the capacity and torque of the turbine is always at any speed less than the induction motors can absorb because the overexcited field prevents the turbo-alternator 10, 11 from breaking the yielding coupling of the motors and running away from the motors at any speed. Thereby I not only improve starting torque but add to the permissible acceleration of the motors so that the full torque of the turbine at any speed may always be employed.

Near half speed of the locomotive, throttles 15 are closed to a generator idling position. Without waiting for the turbo-alternator unit 10, 11 to come to low speed, the generator fields are (or may be) cut down by cutting-in not only resistor 43, but other resistors 45. Then line switch 25 is opened, cutting the power from the locomotive mains 26 and deenergizing all the motors 18. The turbo-alternator then takes on generator idling speed. There remains enough field excitation to keep the generators 11 synchronized through synchronizing line 24. If desired, line switch 25 may be of such capacity or character that it may be opened without deenergizing the field 42, and before the turbo-alternator unit 10, 11 greatly reduces speed, after throttles 15 are moved to idling positions. In any event the locomotive mains 26 being deenergized, pole-changing switches 28 are thrown to give each motor its smaller number of poles (four or six poles in the specific embodiment stated). Thereupon in quick succession (indeed the foregoing operations may be carried out rapidly) the main line switch 25 is again closed, the field excitation restored to an appropriate value and throttles 15 again opened. If during this brief interval, the turbine has not slowed down to a speed correlated to one-half train speed, it will be pulled down by the motors which are so embodied that they always provide more drag torque than the turbine can meet. Throttle opening is continued more rapidly this time again to develop the maximum rate output of the turbo-alternator unit 10, 11 and until the locomotive is developing its fullest speed and torque under full power. At this time, if not before, the field excitation may be reduced by cutting in resistor 43.

After running at above half or full speed, to slow down to half speed and finally to a stop, the throttle operations may be simply reversed. However, once the locomotive and its train are under full power and speed, their slow-down to a full stop may be achieved by simply throttling the turbine and without making a pole-change. Having come to a full stop, however, switch 25 is unfailingly opened and the motor pole-changing switches 28 unfailingly shifted back to their position of the greatest number of motor poles, ready for high-starting torque conditions when again started from rest.

For climbing heavy grades, it will be preferred to employ the greater number of poles, thereby cutting the maximum speed, but doubling the tractive effort as in starting.

From foregoing specification and accompanying illustration it will appear that the turbo-electric drive herein proposed is of the utmost simplicity and exceptionally rugged. Aside from the pole-changing, the alternator and motors can to all intents and purposes be considered as directly connected electrically. The motors are of the squirrel cage induction type, the simplest and least costly of all motors, and since in operation the turbine speed is varied to vary the train speed, performance from throttle control throughout the entire speed range is uniform.

Obviously my invention is susceptible to modification, not only in the way I have indicated heretofore, but also in other ways which, now that my invention is made known, will require but the utilization of engineering skill in the application of the principles of my invention. All such modifications which come within the purview of my invention, I desire to cover in the annexed claims, and this irrespective of circumstantial terminology of the appended claims which my present limited knowledge of those modifications imposes upon me.

What is claimed is:

1. The method of starting a rail vehicle having a variable speed turbo-alternator of the direct-connected type and connected multipolar induction drive motors arranged in parallel and of the changeable pole type, which comprises overexciting the alternator approximately 45% above normal and connecting its output while idling at a low speed to said induction drive motors operating with the maximum number of effective poles, gradually increasing the speed of said alternator, thereby causing the motors to start against a load requiring one and a half times the full load torque obtainable for the same maximum number of effective poles, and subsequently reducing the number of effective poles of the motors to vary the speed ratio between alternator and motors, and reducing the overexcitation of the alternator to normal after partial speed is attained.

2. The method of starting a rail vehicle having a variable speed throttle controlled turbo-alternator of the direct-connected type and connected induction drive motors arranged in parallel of the multiple changeable pole squirrel cage type, which comprises overexciting the alternator approximately 45% above normal and connecting its output while idling at a slow speed to said induction drive motors operating with the maximum number of effective poles to provide a starting torque of one and a half times full load torque for the same maximum number of effective poles, gradually increasing the speed of said alternator by throttle control thereby causing the motors to start and attain partial speed, reducing the excitation to normal after attaining partial speed temporarily throttling the turbo-alternator to permit a reduction in speed thereof and decreasing the excitation thereof while reducing the effective number of poles of the motors to vary the speed ratio between alternator and motors, and subsequently increasing the alternator speed by throttle control to bring the vehicle to high speed.

3. A turbo-electric drive system for a rail vehicle comprising in combination a variable speed turbine, a control throttle for said turbine by means of which the speed of said turbine and vehicle may be varied, an alternating current generator having a direct connection with said turbine to be driven at turbine speed, alternating current induction motors of the changeable pole type for driving said vehicle, connections for supplying the motors with current at generator frequencies which are proportional to turbine speed at all times the motors are driving the vehicle, means for over exciting the generator, for limiting the excitation of the generator to approximately 45%, and for starting the motors at very approximately 5% of the generator full running speed, the turbine, generator, and motors being so coordinated that at all motor driving speeds and at a generator speed of very approximately 5% of its full running speed with the generator overexcited approximately 45%, the capacity and torque of the turbine is less than the motors can absorb, whereby the turbine and generator are prevented from breaking away from the motors, and means for reducing the number of effective poles in said motors after starting and increase in speed.

4. A turbo-electric drive system for a rail vehicle comprising a variable speed turbine, a control throttle for said turbine by means of which the speed of the turbine and vehicle may be varied, an alternating current generator having a direct connection with said turbine to be driven at turbine speed, alternating current induction motors of the changeable pole type for driving said vehicle, connections for supplying the motors with current at generator frequencies which are proportional to turbine speed at all times the motors are driving the vehicle, means for starting the motors at about 7½ cycles by overexciting the generator about 45% and not substantially more than that amount to obtain maximum starting torque, the capacity and torque of the turbine being at all speeds of the motors less than the motors can absorb whereby the turbine and generator are prevented from stalling the motors and breaking away, and means for reducing the number of effective poles in said motors after starting and increase in speed.

5. The method of starting a rail vehicle by an alternating current induction motor of the changeable pole type from a variable speed throttle-controlled turbo-alternator of the direct connected type in which the generator is driven at turbine speed and the motors when driving the vehicle always receive current from the generator at frequencies which are proportional to turbine speed, which comprises selecting a maximum number of effective poles for motor-starting operation, exciting the alternator to approximately 45% above normal for starting the motors from zero speed to partial speed of the vehicle, starting the motors with the frequency of the alternator very approximately 5% of its full running value while absorbing all the available torque of the turbine by said motors, reducing the excitation to normal as the frequency of the alternator and the speed of the motors become increased with increase in vehicle speed, and reducing the number of effective poles in the motors upon attainment of a vehicle speed well below the full running speed.

COMFORT A. ADAMS.